Sept. 5, 1950     O. BOISVERT     2,521,499

SAFETY GUARD FOR PLANING MACHINES

Filed July 29, 1948

Inventor

Onesime Boisvert

By *Clarence A. O'Brien and Harvey B. Jacobson*
Attorneys

Patented Sept. 5, 1950

2,521,499

UNITED STATES PATENT OFFICE 2,521,499

SAFETY GUARD FOR PLANING MACHINES

Onèsime Boisvert, Oneyville, R. I., assignor to Edouard N. Roy, Pawtucket, R. I.

Application July 29, 1948, Serial No. 41,229

4 Claims. (Cl. 144—251)

The present invention relates to certain new and useful improvements in a safety type guard usable in connection with woodworking machines, for example, planers, jointers and the like, and has reference, in particular, to a guard whose construction is such as to permit effective, resistless and proper displacement of work on the table of the machine while affording complete safety, at all times, to all concerned.

In order to appreciate the significance of the present invention it is virtually essential that the reader first read and understand U. S. Patent No. 1,801,326 covering a guard for planing machines granted to me under date of April 21, 1931. Briefly, the patented construction has to do with a fan-like sectional guard, the sections being in the form of general wedge-shaped plates or blades, the latter being hingedly connected with one another at corresponding ends, being capable of telescoping and nesting one within the limits of the other and being normally expanded to safety positions by properly constructed and mounted flat or leaf springs. These types of guards, as covered in the stated patent, are anchored on the work table close to the guide or fence against which the work piece is placed and slid along for coaction with the cutter means. The plate or section of the guard closest to the work actually has direct contact with the work and the other sections are foldable or retractible depending on the space required for passing of the work piece between the fence and coacting or foremost section of the guard. Also, and as covered in the patent the plate sections have coacting detents on their ends opposite to the hingedly connected ends, which detents serve to limit the overall spread of the guard as a unitary assemblage. At the hinged ends a simple assembling and clamping bolt and nut arrangement is employed, the nut being a so-called thumb nut and practice has shown that this part of the construction, the hinging and nut clamping means, is not in keeping with modern requirements of the trade and users.

The object of the present invention is to provide more satisfactory ways and means whereby the companion and complemental plates are hingedly connected and also bound frictionally together for safety locking purposes.

More specifically, in carrying out the principles of the present invention, a hollow nut and rivet serve to hingedly interconnect coacting ends of the plate sections in overlapping and spreadable and contractible relationship, there being a cornice-like clip coacting with the hinged ends, and a bolt and nut arrangement, the nut having a lever pivoted thereon with cam elements to engage the plate portion of the clip and to, in turn, exert the pressure thereagainst to bind the overlapping hingedly connected ends of the stated plate sections whereby to either tighten or loosen the same according to the requirements of the workman.

Other objects, features and advantages will become more readily apparent in the following description and the accompanying illustrative drawings.

In the drawings, wherein like numerals are employed to designate like parts throughout the views.

Figure 1:
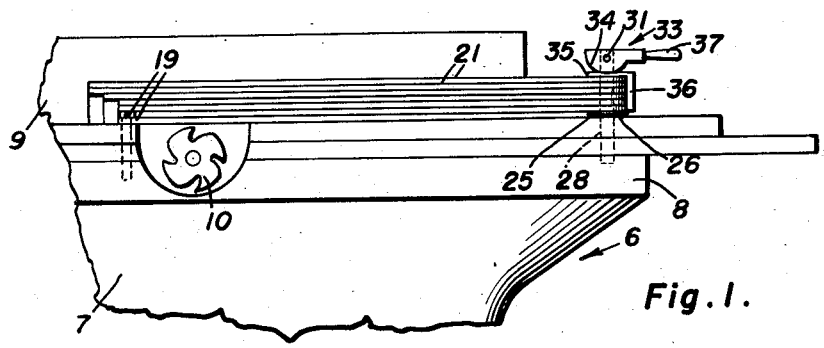
Figure 1 is a fragmentary elevational view showing a portion of a stock type planing machine and further showing the improved protector guard mounted on the machine, or the table of the machine for use.

Referring now to the drawings, it will be understood that so far as the improvements herein are concerned, I have not gone into detail as regards the machine or the precise manner in which the invention coacts with the machine and the work piece on the machine. All that is necessary, I believe, is to show broadly any suitable jointer or planer machine 6 having a supporting leg structure 7 and a top or table portion 8. The work piece may be denoted by the numeral 9 and the rotary cutter by the numeral 10.

Figure 2:
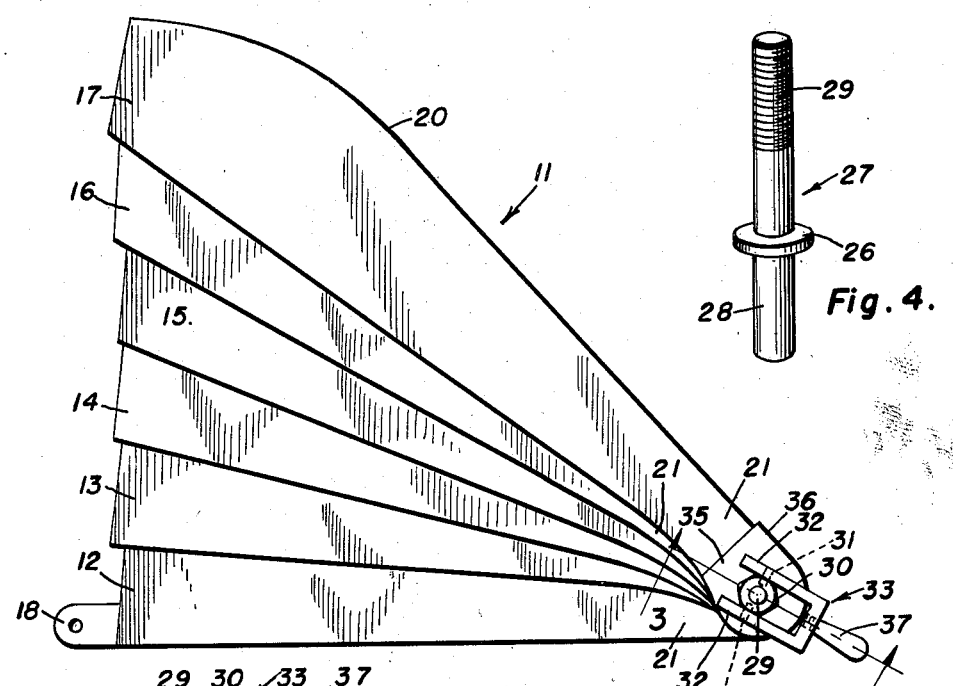
Figure 2 is a plan view of the guard per se with the plate sections spread apart, showing the improved hinging and locking means.
Figure 4:
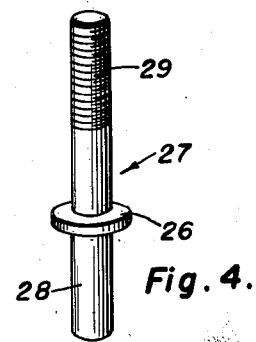
Figure 4 is a perspective view of the assembling and attaching bolt.

Not only am I not concerned with the details of the machinery herein, but I have not attempted to detract from the novelty and the showing in the drawings by including details of construction of the safety guard 11. The guard is similar, if not substantially identical, to that shown in my previous Patent No. 1,801,326 except for minor details and the improved hinged means here shown. Reverting to the patent it will be noted that a bolt and nut serves to hingedly adjoin the narrow end portions of the respective plates or sections. Here a different type of connection and locking means is employed. Before discussing the latter I would call attention to the fact that the plate sections, which are of wedge-shaped general form are denoted by the numerals 12, 13, 14, 15, 16 and 17. There is a lug 18 on the first plate section 12 which is fastened down by a bolt 19 on the table portion of the stated machine. The main or foremost section has the desired curvate edge 20 which is closest to the work and the work comes into contact with said edge and "cams" the plate sections closed, that is, progressively and one at a time depending on the size of the work piece. Usually, however, the sections are spread out in the fan-like manner disclosed in the drawings in Figure 2.

Figure 3:
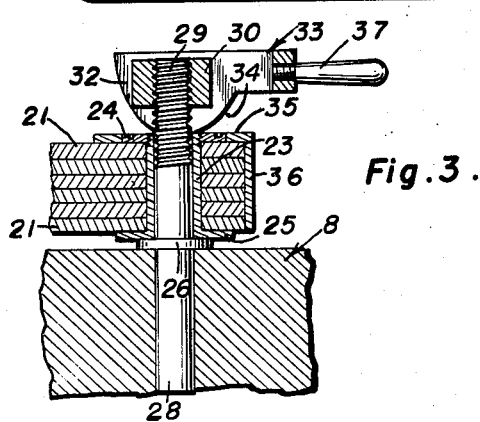
Figure 3 is an enlarged fragmentary sectional and elevational view on the plane of the line 3—3 of Figure 2, looking in the direction of the arrows.

Referring now to Figure 3, I call attention to the fact that the narrow or shank portions 21 of the respective plate sections are disposed in overlapping or superimposed relationship and are apertured and that a hollow rivet 23 is passed through the aperture. The screw-threaded end of the rivet has an assembling nut 24 connected thereto. The headed opposite end of the rivet 25 is beneath the lowermost shank and this rests upon the flange 26 of a special bolt 27 which I use. The stem portion 28 of the bolt fits into a socket thus anchoring it to the work table 8. The shank portion 29 is screw-threaded and extends through and beyond the nut 24, where it serves to accommodate an assembling nut 30 having outstanding journals 31 which journals are journaled in bearings provided in spaced parallel portions 32 of a U-shaped lock 33. The portions 32 are formed with the cams 34 and these provide locking and take-up surfaces and they rest upon the horizontal flexible plate portion 35 of an angle or cornice-type clip. The flange portion 36 of the clip is suitably curved and rests against the coacting rounded end portions of the shanks 21. The plate portion is apertured to accommodate the nut 24 and the clamping cams 34 do not bear on the nut but rather on the plate itself. Thus, by exerting the desired cam pressure on the plate 35, the latter binds the shank portions 21 between the plate and the head 25 on the rivet, whereby to frictionally connect the shanks and to thus "lock" the aforementioned plate sections in open, closed and intermediate positions. The U-shaped lock is provided with a convenient handle or hand-grip 37 as shown in Figure 3. It follows that the novelty here has to do with a clip which is substantially L-shaped in configuration which caps or hoods over the hingedly connected shank portions of the spreadable and contractible plate sections. The plate sections or shanks overlap and these are hingedly connected by a hollow rivet or bolt which, in turn, serves to accommodate a solid bolt, the solid bolt serving to anchor the entire structure on the work table and the threaded upper end of the bolt projecting beyond the corresponding end of the hollow bolt where the assembling nut 30 carries the cam-lock 33 which is pressed down or lifted up, depending on requirements through the medium of the convenient handle or hand-grip 37.

This perfected guard has meritorious features which permit no interference with the workman at any time. This lack of interference effectively does away with guard resentment and builds assurance that the guard will always be found in its proper position on the jointer. The guard is so constructed and applied to the jointer that it is impossible for it to swing outward from the table of the jointer into the passageway. This prevents serious and dangerous interference with the workman in the passage of stock over the table of jointer; a feature which not only protects the workman but also insures the safety of those passing by. My guard may be used safely, conveniently and without harm to the guard as a return passage for the work.

A careful consideration of the foregoing description in conjunction with the invention as illustrated in the drawings will enable the reader to obtain a clear understanding and impression of the alleged features of merit and novelty sufficient to clarify the construction of the invention as herein claimed.

Minor changes in shape, size, materials and rearrangement of parts may be resorted to in actual practice so long as no departure is made from the invention as claimed.

Having described the invention, what is claimed as new is:

1. In a fan-style expansible and contractible safety guard for use on a jointer or the like, guard means comprising a plurality of interconnected flat plates having shank portions at corresponding ends, said shank portions being stacked upon one another and apertured, a hollow bolt passing through the apertures and having heads at opposite ends engaging the adjacent shank portions, a solid bolt passing through said hollow bolt and having a shoulder engaging one of the first-named heads and having a screw-threaded shank portion projecting beyond the remaining head, an assembling nut on the screw-threaded end of said shank, a U-shaped member having parallel arms disposed on diametrically opposite sides of and hingedly connected to said nut, said arms having cam locking members engageable with an adjacent plate section to bind the shank portions of all plate sections together or to loosen the same as required.

2. In a fan-style expansible and contractible safety guard for use on a jointer or the like, guard means comprising a plurality of interconnected flat plates having shank portions at corresponding ends, said shank portions being stacked upon one another and apertured, a hollow bolt passing through the apertures and having heads at opposite ends engaging the adjacent shank portions, a solid bolt passing through said hollow bolt and having a shoulder engaging one of the first-named heads and having a screw-threaded shank portion projecting beyond the remaining head, an assembling nut on the screw-threaded end of said shank, a U-shaped member having parallel arms disposed on diametrically opposite sides of and hingedly connected to said nut, said arms having cam locking members engageable with an adjacent plate section to bind the shank portions of all plate sections together or to loosen the same as required, said U-shaped member being provided with a hand-grip.

3. In a fan-style expansible and contractible safety guard for use on a jointer or the like, guard means comprising a plurality of interconnected flat plates having shank portions at corresponding ends, said shank portions being stacked upon one another and apertured, a hollow bolt passing through the apertures and having heads at opposite ends engaging the adjacent shank portions, a solid bolt passing through said hollow bolt and having a shoulder engaging one of the first-named heads and having a screw-threaded shank portion projecting beyond the remaining head, an assembling nut on the screw-threaded end of said shank, a U-shaped member having parallel arms disposed on diametrically opposite sides of and hingedly connected to said nut, said arms having cam locking members engageable with an adjacent plate section to bind the shank portions of all plate sections together or to loosen the same as required, said U-shaped member being provided with a hand-grip together with a clip having a portion resting on one shank portion and apertured to accommodate one head of the hollow bolt, and having a flange portion engaging longitudinal edge portions of the shank portions.

4. In a structure of the class described, in combination, a relatively fixed support, a bolt having a stem portion fitted in a socket in said support, said bolt having a shank portion and a flange providing a shoulder, said shank portion being screw-threaded, a safety guard embodying a plurality of plate sections having shank portions disposed in overlapping relationship and apertured, a hollow rivet having a head engaging one shank portion and resting on the shoulder on said bolt, said hollow rivet surrounding the shank portion of the bolt, a screw-threaded nut carried by the remaining end of the hollow rivet and engaging the adjacent shank portion of one of said plate sections, a cornice-clip having a plate portion apertured and surrounding the nut and bearing directly against the adjacent shank portion and having an edge flange right-angularly disposed and engaging edge portions of said shank portions, an assembling nut on the threaded end of said shank, a U-shaped member hingedly mounted on said nut and having cams engaging the clip, and a handle connected to said U-shaped member.

ONÈSIME BOISVERT.

REFERENCES CITED

The following references are of record in the file of this patent:

UNITED STATES PATENTS

| Number | Name | Date |
|---|---|---|
| 738,883 | Caton | Sept. 15, 1903 |
| 998,873 | Couture | July 25, 1911 |
| 1,235,403 | Weaver | July 31, 1917 |
| 1,788,663 | De May | Jan. 13, 1931 |
| 1,801,326 | Boisvert | Apr. 21, 1931 |
| 1,812,452 | Shaw | June 30, 1931 |